United States Patent
Kalman

[19]

[11] Patent Number: 6,057,025
[45] Date of Patent: May 2, 2000

[54] COMPLETE SEAMLESS HONEYCOMB STRUCTURE AND A METHOD FOR MANUFACTURING THEREOF

[76] Inventor: Oskar Kalman, 965 E. San Carlos Ave., San Carlos, Calif. 94070

[21] Appl. No.: 09/195,503

[22] Filed: Nov. 19, 1998

[51] Int. Cl.$^7$ ........................................... B32B 3/12
[52] U.S. Cl. ...................... 428/116; 428/118; 264/177.12
[58] Field of Search ..................................... 428/116, 118; 264/177.12

[56] References Cited

U.S. PATENT DOCUMENTS

| | | | |
|---|---|---|---|
| 3,509,005 | 4/1970 | Hartig | 428/116 X |
| 3,812,230 | 5/1974 | Takahashi | 428/116 X |
| 3,837,991 | 9/1974 | Evans | 428/116 X |
| 5,047,277 | 9/1991 | Kunz | 428/116 |
| 5,139,603 | 8/1992 | Kunz | 156/205 X |
| 5,256,054 | 10/1993 | Cocchetto et al. | 264/177.12 X |
| 5,286,323 | 2/1994 | Bagley | 264/177.12 X |
| 5,314,650 | 5/1994 | Adler et al. | 264/177.12 X |

*Primary Examiner*—Timothy M. Speer
*Attorney, Agent, or Firm*—I. Zborovsky

[57] ABSTRACT

A complete seamless honeycomb structure, comprising a core of cells between two facesheets, either in the form of a flat or curved panel. This structure is extruded in a direction perpendicular to the direction of axes of the cells from all combinations of extrudable and mutually fusible materials and completed in one technological sequence, e.g., without subsequent welding, chemical bonding, gluing and the like assembly operations. The method of manufacturing is characterized by continuously extruding a sheet (so-called "coresheet") which is continually deformed in the direction perpendicular to the direction of extrusion into a core, simultaneously and continuously extruding facesheets and joining them to the honeycomb core while adjoining materials in the zones of connection are still in their mutually fusible state. Thus a seamless honeycomb structure is formed.

16 Claims, 9 Drawing Sheets

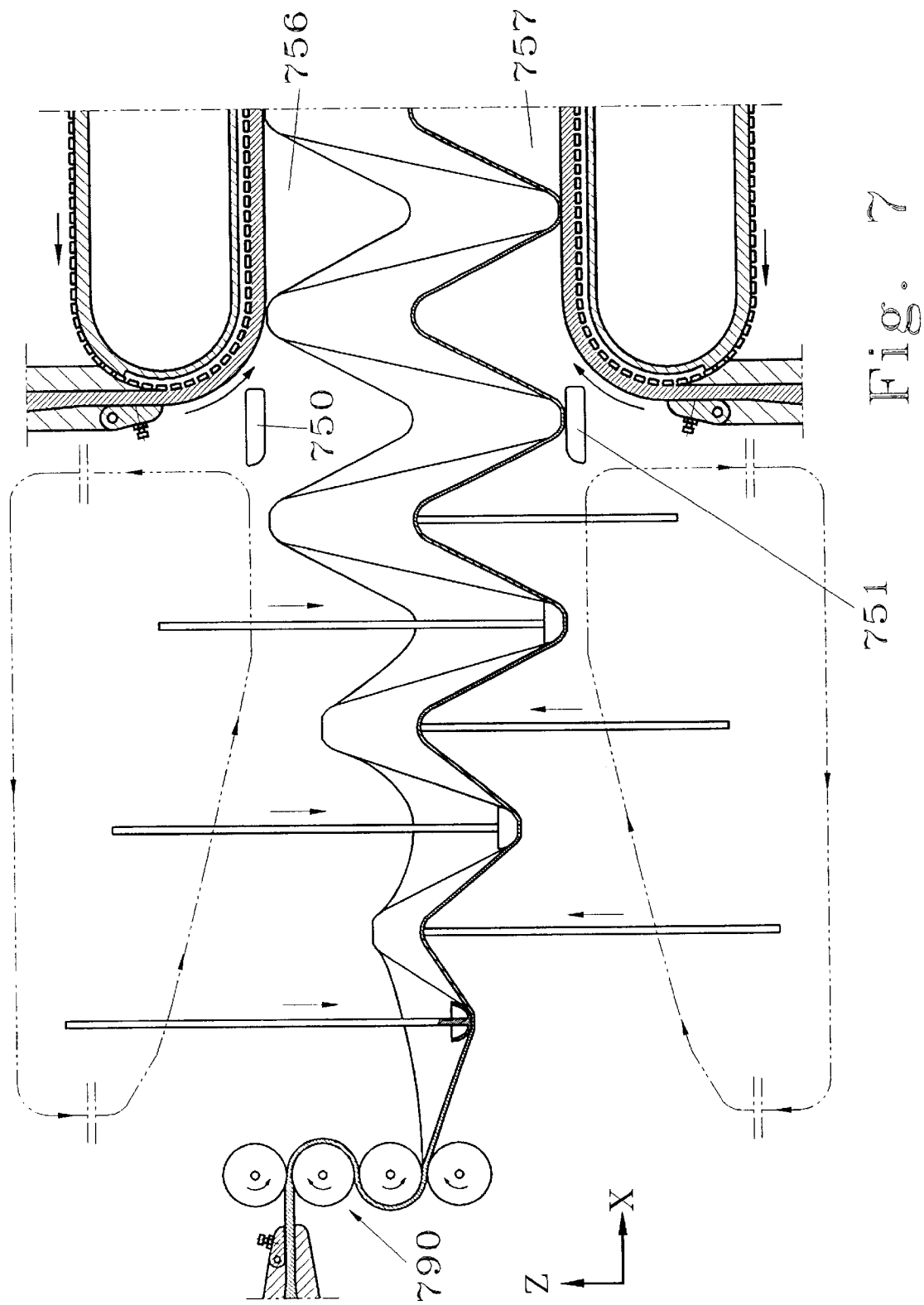

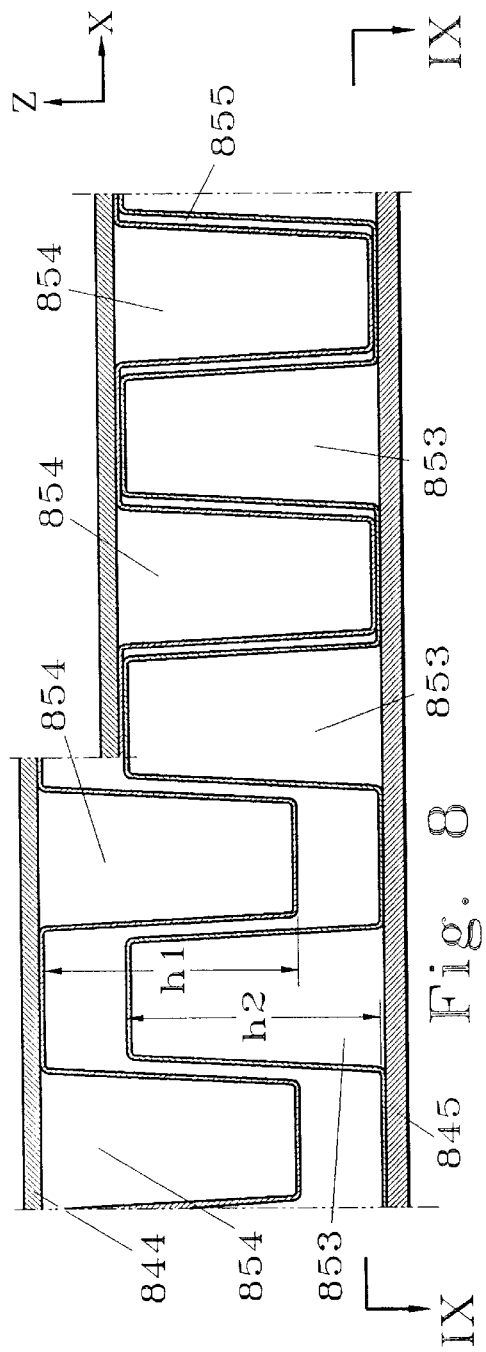
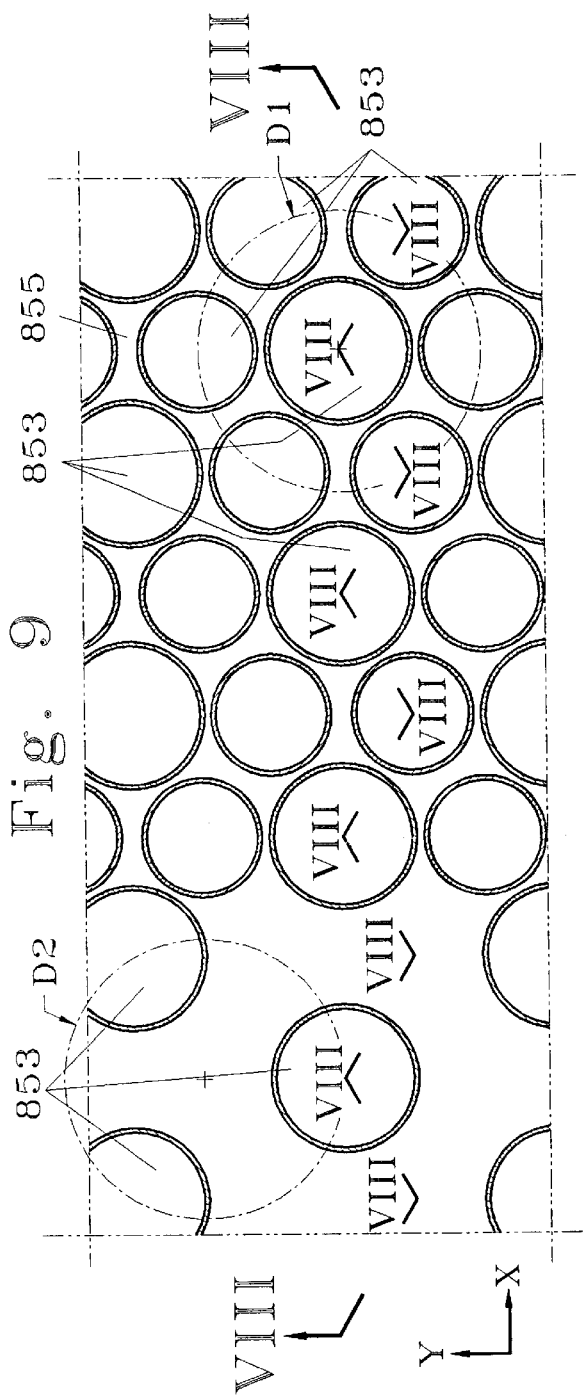

COMPLETE SEAMLESS HONEYCOMB STRUCTURE AND A METHOD FOR MANUFACTURING THEREOF

BACKGROUND—FIELD OF INVENTION

The invention relates to a honeycomb structure, in particular, to a complete honeycomb structure—a core formed from a single coresheet and enclosed between two facesheets—which can be produced in an integrated process. The invention relates to a complete honeycomb structure and to a method of manufacturing such a complete structure in a single technological sequence.

BACKGROUND—DESCRIPTION OF THE PRIOR ART

A complete honeycomb structure usually means a multiple-cell core, formed by a multitude of alike hexagonal, rectangular or other shape cells, connected at least on one side to a sheet known as a "facesheet".

Honeycomb structures have three unique properties. First, honeycombs have the highest strength-to-weight and stiffness-to-weight ratios; of all feasible load-carrying elements, a honeycomb uses far less material, sometimes tens of times less material, than an equal-rigidity solid sheet, panel, beam, shell or profile. Modern aeronautics is unthinkable without honeycomb structures. Second, honeycombs have the most favorable crush strength-to-weight ratio which gives them a unique ability to absorb kinetic energy from either a localized or total crush; as long as a honeycomb being crashed still has some of its crash energy absorption ability left, it transfers only a minimum load to its support structure. Third, honeycombs have a favorable inner surface-to-weight ratio; that makes them ideal for a variety of special applications, such as heat exchangers, chemical converters, and insulators.

Honeycomb structures are currently produced in small lots, using many technological steps and different pieces of equipment. Therefore, the current honeycombs, especially those of better performance, have a number of common shortcomings:

The first major shortcoming of currently used honeycomb structures is a high cost of production: the cost of making honeycombs is much more than can be saved in the reduced cost of materials. Therefore honeycombs are currently used primarily in applications which cannot "fly" without the use of honeycombs, such as aircraft and some applications of mass and heat exchange. "Captive" industries have no choice but to use honeycombs, and to pay handsomly for them. Naturally, "captive" industries are also the major defining factor behind the current state of the art of honeycomb technology.

The second major shortcoming of currently used honeycomb structures is that most of them are so-called "special-purpose" honeycombs that reflect the needs of "captive" industries as those industries themselves understand them. Instead of more-or-less universal honeycombs of low price and good quality—from which required-size pieces could be cut and used as needed more or less the same way as "traditional" prefabricated raw materials, such as solid sheets, boards, profiles, etc., are used—"captive" industries ask their honeycomb vendors for better-and-better performance and tighter tolerance tailored for their specific products.

The third major shortcoming of currently used honeycombs is that they are unsuitable for currently untapped manufacturing industries. "Captive" industries represent only a small fraction of all manufacturing industries. In addition, "captive" industries are not large-scale mass-production, at least not in the same sense as the electronics, and consumer goods industries are. The bulk of all manufacturing industries—such as construction, furniture, ship building, transportation, marine, shipping box, and automotive industries—build their shells and other rigidity-providing structures by cutting and joining "traditional" prefabricated raw materials, such as solid sheets, boards, profiles, and the like.

At the same time, honeycomb-like designs are quite often built by "non-captive" industries in the process of their own manufacturing, but almost never in their near-optimal form. For instance, everyone knows how the usual wall of a family house is constructed: an interconnected structure of vertical and horizontal two-by-fours sandwiched between a sheet of plywood and a sheet of gypsum, and filled with insulation which has no structural role, all the pieces being cut, fit and joined on the spot. Such a wall looks pretty much like an ad hoc-assembled honeycomb with very large size rectangular cells. When one looks for it, there are enough similarities between prefabricated honeycombs and many a solution by which rigidity is achieved in products made by "non-captive" industries. The major difference is that the prefabricated honeycombs produced by the honeycomb experts are much more efficient, but they are also difficult to come by in required shapes and sizes, expensive to order, and difficult to fit into existing designs and/or assembly procedures.

In order to capitalize on the immense untapped opportunities in "non-captive" industries—in those industries which can get by without using honeycombs—the cost of good performance honeycombs has to come down not only to being an economically better alternative to the current solutions based upon the use of solid "raw materials", but also to pay for the re-orientation of companies toward using honeycombs. In other words, in order to capitalize on the potential mega-market of "non-captive" industries, we have to produce low-cost, good performance honeycombs. That is feasible only when we learn how to mass-produce good performance honeycomb structures for a wide range of applications.

Once companies in "non-captive" industries find commercially available, low-cost universal honeycombs which could improve their "bottom-lines" (including the cost of re-orientation to use honeycombs instead of their current solutions), that universal honeycomb market will quickly surpass the current "special-purpose" honeycomb market for "captive" industries.

Let's now look at two different approaches currently used to make honeycombs: 1) making them from sheet material; and, 2) making them by extrusion from powder- or pellet-like materials.

1) The majority of honeycombs are made from sheet materials. The usual process consists of the following technological operations: cutting strips from a sheet material; forming the strips; joining the strips into a core by welding, gluing or chemical bonding so that each strip will be bonded intermittently with its neighbor on one side, and then with the other member on the other side; and gluing or otherwise fastening facesheets atop of the core. If the joining of the strips into the core and the fastening of the core with the facesheets have been done by heat- and pressure-assisted means, such honeycomb structures usually have to be cured. Often the joining and impregnation operations involve the use of environmentally unfriendly chemicals and processes.

The major shortcoming of this approach is that the above-mentioned ill-matched variety of technologies comprising this approach is difficult to consolidate for the purpose of massproduction. In addition, in order to make a good quality honeycomb we have to use high precision sheets—which are quite expensive.

2) The other currently used approach to making honeycombs starts with extruding their cores in the direction of axes of their cells. When a core is extruded in the direction of the axes of its core, such a honeycomb-shape extrusion could be sliced into core-thickness pieces, and facesheets adjoined to the face surfaces of such cores.

The appeal of the extrusion-based technologies comes from the fact that extrusion, at least in mass production, is the cheapest forming process known. Also, raw materials for extrusion are much cheaper than ready-made precision sheets of the same materials. That is why extrusion-based technologies are more promising than others. That is why in the last decade there has been a surge in the number of patents issued for this group of technologies; in the US, most of these patents have been assigned to the Corning Corporation.

Let us look at some of these patents.

U.S. Pat. No. 5,308,568, Extrusion Die and Method, issued to G. Daniel Lipp in May 1994, is a typical patent of that kind. Some of the patents related to extrusion of honeycombs, such as U.S. Pat. No. 5,256,054, issued to Joseph F. Cocchetto, et al., in October of 1993, go a step further: they disclose ways for providing a facesheet over an extruded honeycomb core. Closer examination of these and other patents related to extruding honeycomb cores in the direction of the axes of their cells makes it obvious that they are meant for making relatively small size honeycomb cores. That kind of technology cannot be converted for mass production of large-size universal honeycomb systems.

Still, there is one unique variation of the core extrusion-related technology which removes one of the constraints on the core size. This technology is described in U.S. Pat. No. 5,314,650, issued to M. D. W. Adler, et al., in May of 1994. The particularity of this solution to extruding honeycomb cores in the direction of the axes of their cells is that the extrusion is done through a rotating cylindrical die, and a core-height slice is continuously "peeled off" from the rotating extrusion die by a stationary cutting device. This particular variation provides the means for making an endless web of honeycomb core; the width of the web, however, is still limited by the maximum feasible length of a rotating extrusion die, which is many times less than the maximum width of traditional sheet extrusion dies used with standard extruders. A serious deficiency of this technology is the difficulty of controlling the thickness of the core and the quality of the face surfaces of a thusly produced core: the "peeling off" process of the freshly extruded parison, done in the direction perpendicular to the cell axes, distorts the shape of the cells around the cutting surface.

For the reasons which are beyond the scope of this review, currently the extrusion-based honeycomb core technology is used primarily for making ceramic honeycombs.

In conclusion, both of the above described honeycomb technologies—where cores are made from prefabricated sheets, and where the cores are extruded in the direction of the axes of their cells—are unsuitable for mass production of honeycomb structures, the cost, performance and physical dimensions of which can satisfy a wide variety of needs.

True, honeycombs are already gaining some limited application in "noncaptive" industries. However, it would be erroneous to conclude that the cumulative effect of this trickle of disjointed applications will in some foreseeable future lead to across-the-board acceptance of honeycombs as a feasible "raw material" for "non-captive" industries.

The simplest and least costly honeycomb technology is used for making prefabricated walls for office additions, office space separators, and furniture. In this version of honeycomb technology, the strips of chemically impregnated paper are fastened not by gluing them together, but by inserting slotted strips into the opposing slots of their mirror-image strips. After such a-slot-in-a-slot loosely joined assembly of strips is expanded into a core of parallelogram-like cells, the core is hardened by a heat-induced chemical reaction. That increases the ability of the strips to take edge-to-edge load.

Even this limited use of inexpensive paper-based honeycombs gives us a glimpse of benefits which can be derived from the use of prefabricated low cost universal honeycombs by "non-captive" industries instead of traditional raw materials, such as sheets, boards and profiles. Here are some of the more obvious potential benefits: switching from easily decaying or deficit materials, such as metals and wood, to polymeric materials (in many applications, even an inexpensive thermoplastic composition can, pound per pound, outperform metals, wood, fiberglass, etc., especially cost-wise); drastically reducing the weight of products and simplifying their transport and handling; cutting the cost of products; and simplifying assembly and disassembly operations.

The products of the above mentioned applications—walls for office additions, office space separators, and furniture—have been designed specially for using paper-based honeycombs. However, in order to add prefabricated honeycombs to the list of the "raw materials" for already successful products, the product designs have to be adjusted accordingly: at least the adjoining elements between the honeycomb and non-honeycomb portions have to be re-designed. The feasible applications of paper-based honeycombs, however, are too limited to trigger a wide-scale switching of the existing product designs of "non-captive" industries toward the use of honeycombs.

Attempts have been made to lower the cost of honeycombs by producing the entire honeycomb structure, i.e., a core between two facesheets, in a single technological sequence and using a single piece of equipment. U.S. Pat. No. 5,047,277, issued to B. P. Kunz in September of 1991, and 5,139,603, issued to the same author in August of 1992, present a technology in which a honeycomb-like structure is produced in a single technological sequence. An endless web of sheet material is continuously cut into a number of strips which are chemically impregnated, and then continuously deposited side-ways as parallel, sinusoidal ribs on another continuously fed web of material which becomes a facesheet. In order to increase the stiffness of the ribs and secure the adhesion of the edges of the ribs to the facesheet, the structure is subjected to heat. Another facesheet may be fastened atop this structure either in the same sequence, or later.

There are several problems with the honeycombs of these two patents. First, the load-carrying and deformational characteristics of such structures are highly dependent on their orientation, as well as on the uniformity of the chemical impregnation and heat treatment: especially if the loads or their directions can shift, the honeycombs have to be considerably oversized. Second, additional technological rope-like elements are used to secure the uniformly sinusoidal shape of the ribs during the manufacturing process and left there; as many rope-like elements are used as there are ribs. Third, the manufacturing process requires several different, specific raw materials: a web of sheet material for ribs, another web of a different sheet for the lower facesheet, the chemicals, the above-mentioned rope-like materials and, later, still another web of sheet material for the upper facesheet. The need for a good number of different raw materials, some of them in an already "value-added" form (e.g., sheets with various degrees of precision), is a shared shortcoming of the majority of currently used honeycomb technologies.

By their nature, most of the chemicals used in the production of honeycombs—be that for impregnation and stiffening of core elements, bonding the core elements to one another to form the core, or bonding the core to the facesheets—are usually toxic and require careful handling. With the use of chemicals also comes the need for restoring the potency of the depleted chemicals, neutralizing the depleted chemicals, or both.

Mr. B. P. Kunz's technology shares another shortcoming of many current honeycomb technologies which use heat-activated chemical reactions for bonding elements into a structure: a high probability for residual stresses. The same holds true for welded or glued joints. In addition, the larger the number of elements which go into making a rigid assembly, such as a complete honeycomb, and the higher the number of separate operations it takes to make it, the more inaccuracies could accumulate into the end product, and the more prone the product usually becomes to having stress concentrations.

I know of only one technology which is suitable, at least in principle, for mass production of universal honeycombs. This particular technology is revealed in a currently pending U.S. patent (by V. Prutkin and O. Kalman, application Ser. No. 08/832,343, Filing Date Apr. 2, 1997). This is a fully extruded seamless honeycomb technology: a core is formed from a number of continuously extruded core elements which are immediately shaped and interconnected into a core; thereafter two facesheets are continuously extruded and fused with the respective face surfaces of a continuously moving core into a complete honeycomb structure. Here is how this works:

A finite number of identical core elements is continuously extruded through a main extrusion head in the direction of extrusion, and immediately deformed in substantially lateral direction(s) to the extrusion when the material of the core elements is in its viscous-flow state.

In the course of their deformation, the near-molten core elements come into contact with certain neighboring (adjacent) core elements and become interconnected by fusion (contact-fusion) with them over the zones of contact between the adjacent core elements. A row of multifaceted cells is added to the already formed core by fusing every second core element with its adjacent core element on its immediate left, and then on its immediate right. Such a core has two mutually parallel face surfaces. Then a facesheet is constantly extruded through a facesheet extrusion head onto at least one face surface of the already formed core and fused to the elements of the core on its face surface.

The major shortcoming of the above described universal honeycomb technology is that it is highly complicated: A large number of alike core elements are extruded simultaneously and each of the core elements is immediately deformed in a mirror-like image with its immediate neighbor element; in the process of deformation, the adjacent surfaces of the core elements have to be pair-wise fused to form the core.

Because of all these complexities, the technological apparatus will be too costly and time-consuming to produce. Especially during the introductory stage of low-cost universal honeycombs for "non-captive" industries, the production apparatus should be much simpler and, thus, much easier to build, service and control, and more reliable in its work.

OBJECTS OF THE INVENTION

It is an object of this invention to provide a complete honeycomb structure which is extremely simple and reliable in its construction, and versatile in its applications;

It is another object of the invention to provide a honeycomb technology which do not use chemicals in its production process;

It is another object of the invention to provide a complete honeycomb structure elements of which are joined together without gluing, welding or other special means of fastening elements, so that the joints are free of technology-dependent residual stresses (which otherwise have to be dealt with by adding a special curing operation);

It is another object of the invention to provide a complete honeycomb structure the elements of which are as much as possible "self-adjusting" to one another in the process of their production and assembly, so that the production process is simple to control, and the complete honeycomb structure is less prone to stress concentrations caused by anomalies in the honeycomb structure;

It is another object of the invention to provide a complete honeycomb structure in which the core and the facesheets are produced and interconnected in a single technological sequence, so that such a complete honeycomb structure is suitable for mass production;

It is another object of the invention to provide a method of mass production of the complete honeycomb structure which does not impose additional limitations on the physical dimensions of the honeycombs;

It is another object of the invention to provide a complete honeycomb structure and a method of its mass production which mass-produces the honeycomb structures at the lowest possible cost of production;

It is another object of the invention to provide a complete honeycomb structure and a method of its mass production which can be made from a variety of materials with a wide scope of different properties, and use the raw materials in their least expensive form possible;

It is another object of the invention to provide a complete honeycomb structure which can be as universal in its applications as it is deemed to be advantageous at the time for commercial considerations.

The overall objective of this invention is commercial: to provide the easiest means for large-scale conversion of "non-captive" industries toward the use of ready-made honeycomb structures so that they are affordable and often highly advantageous alternatives to their traditional raw materials used to provide the rigidity and some other characteristics to their products.

BRIEF DESCRIPTION OF THE DRAWINGS

FIG. 7 is a vertical section of a plunger-assisted core formation in the extrusion of a flat honeycomb structure where cells of the core are formed in two opposite directions, both of which are substantially perpendicular to the direction of extrusion;

FIG. 8 is a vertical section of a honeycomb structure with double core;

FIG. 9 is a horizontal section of the same honeycomb structure shown in FIG. 8.

GENERAL OVERVIEW OF THE INVENTION AND SOME DEFINITIONS

Figure 1:
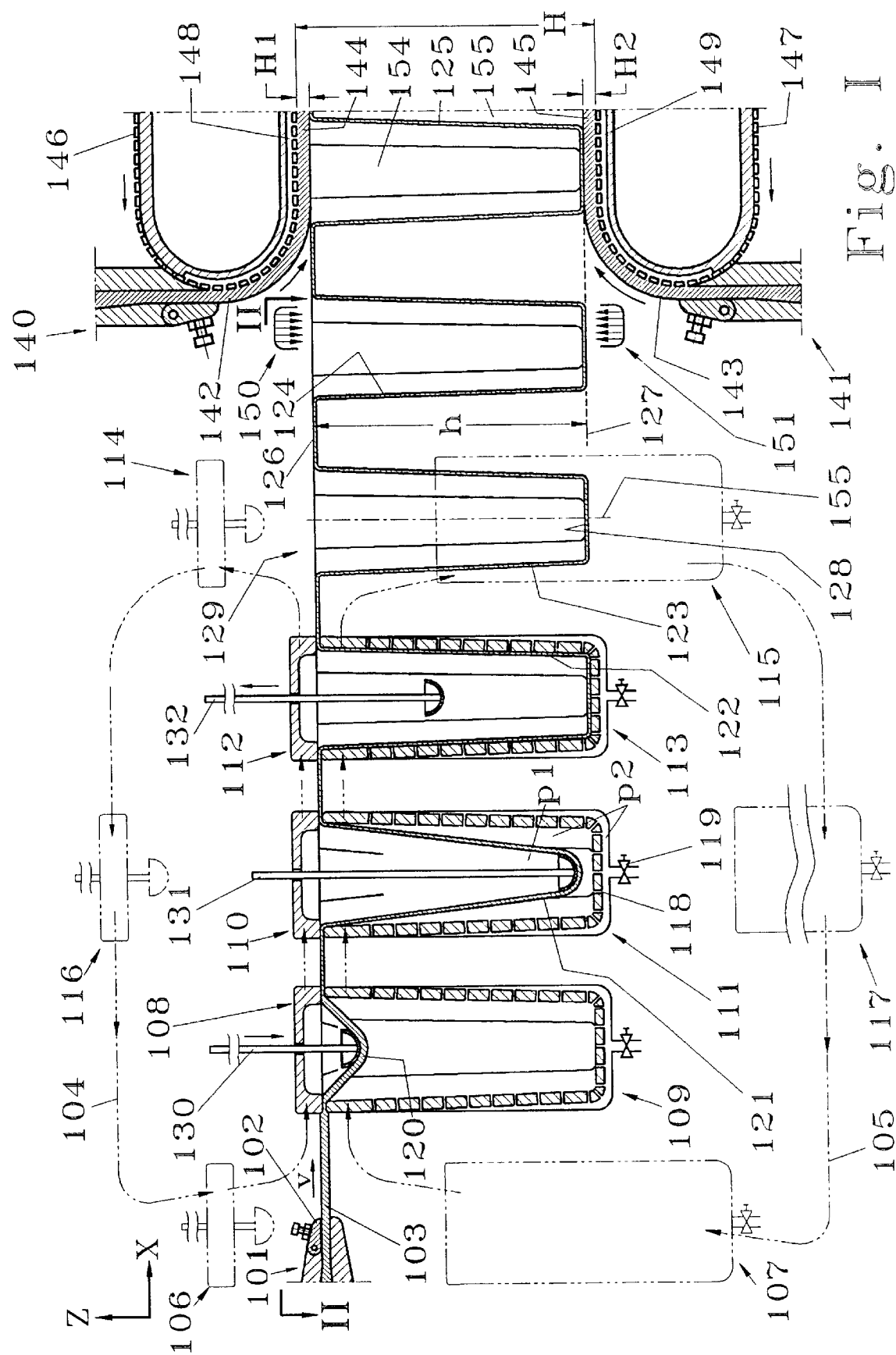
FIG. 1 is a vertical section of a plunger-assisted and vacuum-assisted core formation in the extrusion of a flat honeycomb structure where cells of the core are formed in a direction substantially perpendicular to the direction of extrusion.

This invention relates to the method for manufacturing a complete seamless honeycomb structure by extrusion in the direction substantially perpendicular to its cell axes, and to said extruded, complete seamless honeycomb structure itself, a core between two facesheets.

The honeycomb structure of this invention differs from all known to me honeycombs and honeycomb structures by the form of its core. The core in the honeycomb structure of this invention is made of a single sheet of material; the material is formed into identical rows of hollow cells (here called "dome-like cells", or simply "domes") and an interconnected structure; all the domes are monolithically interconnected by the interconnected structure at the vicinity of their largest cross-section. The uniqueness of this particular solution for a core is in both the monolithic nature of such a core, consisting of a multitude of domes and an interconnecting structure, and the natural transition of the interconnecting structure into the structure of any of the domes; there is no particular point in which the interconnecting structure becomes a dome. The interconnecting structure is not a facesheet, although in some embodiments the material of the interconnecting structure can be fused with one of the facesheets, in others it remains between the facesheets helping to divide the inner space of the honeycomb structure into two separate spaces.

Also, while multiple domes formed into a sheet material have already been used in various support applications, they have not been used as a core fused with facesheet(s) to become a complete honeycomb structure.

The invented process starts with continuous extrusion of a single sheet, so-called "coresheet", into which domes are formed by mechanical means, or by fluid-pressure means, or by a combination of both; the forming of domes is completed before the coresheet material has time to cool below its pliant state. When the core is cooled by being exposed to the forming environment and becomes rigid enough in the direction of the axes of its domes, a facesheet is continuously extruded onto at least one of its two face surfaces. The freshly extruded facesheet warms up the somewhat cooled surface layer of the core's face surface, and the facesheet and the core get fused into a complete seamless honeycomb structure.

In the context of this invention, "seamless" refers to the quality of the interconnections between the initially separately extruded elements of a honeycomb structure. Fusion of two elements made from mutually fusible materials—while the extruded materials are still in their mutually fusible states—gives the best possible penetration of macromolecular fragments of the material of one element into the material of the other element across the initial zone of contact (interface). That material-to-material sub-particle penetration is uniform statistically in all cross-sections of the zone of contact. That blurring of the initial interface and the uniformity of transition of one material into the other provides thermodynamic stability for a so interconnected structure. In that sense, a fused honeycomb structure of this invention is seamless, monolithic even when all its elements are extruded from different (but mutually fusible) materials.

In this invention we recombine the skills and means known for decades in other applications for a new use, to provide a complete honeycomb structure. For instance, in blow-extrusion and in production of corrugated pipes a continuous extrusion has been combined with other means to reshape the freshly extruded material into various forms; in order to facilitate fusion between separately produced polymeric items when these items themselves are moving on a continuous production line, the selected surfaces of the items have been heated with low-inertia heaters; sheet materials in their heated form have been vacuum-molded. We use these and some other known skills and means for production of honeycomb structures.

The domes can be formed into the coresheet by a process which is to a great degree analogous to the process by which corrugated wall tubing is produced using two chains of constantly moving mold blocks. A cross-section of a dome across its axis can be of a circular, hexagonal, or of a number of other shapes. Moreover, the same dome can have differently shaped cross-sections along its axis; for instance, a dome in its wide part can have a hexagonal cross-section, and a circular one in its narrower part.

Figure 3:
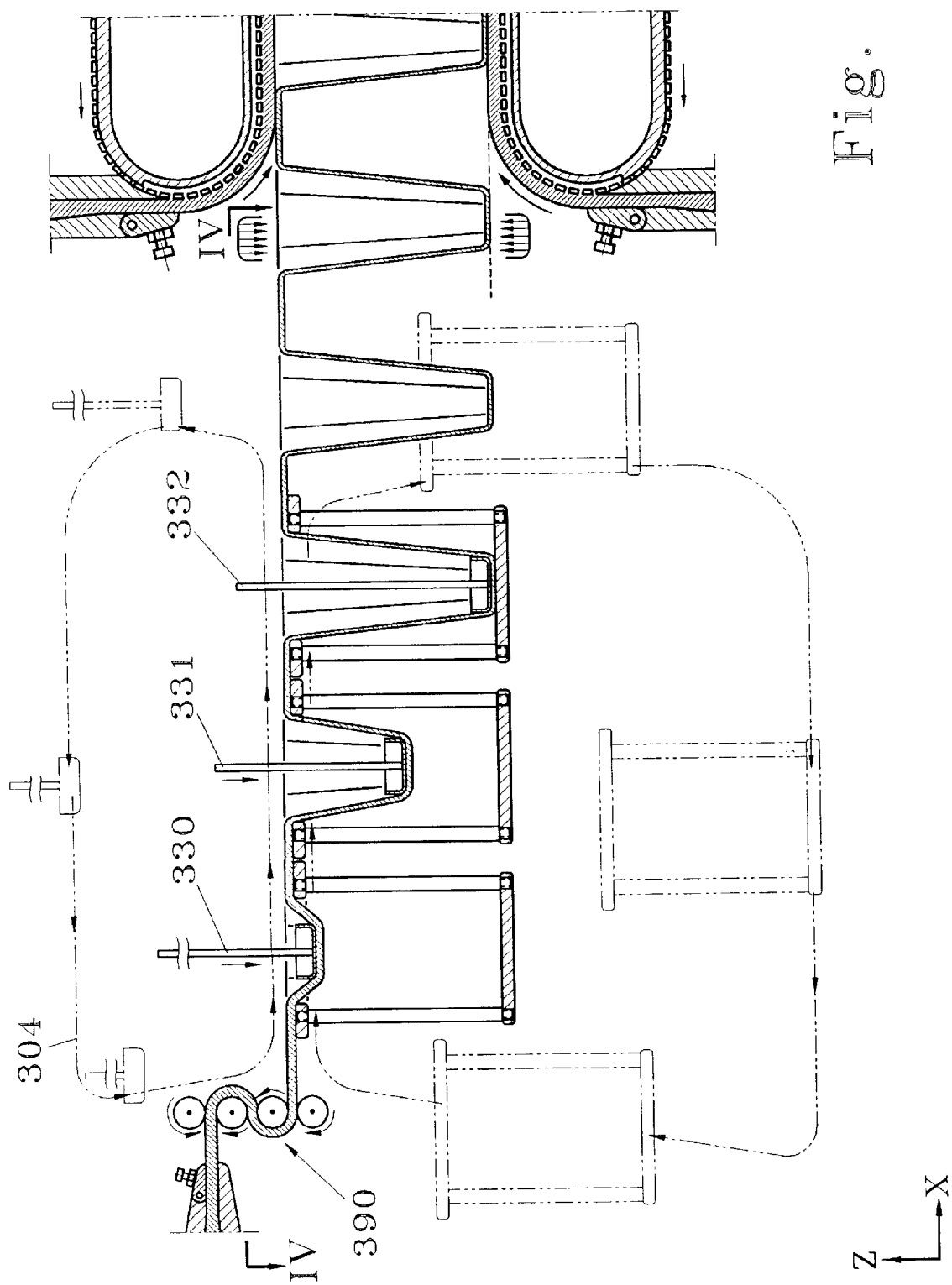
FIG. 3 is a vertical section of a plunger-assisted core formation in the extrusion of a flat honeycomb structure where cells of the core are formed in a direction substantially perpendicular to the direction of extrusion.
Figure 5:
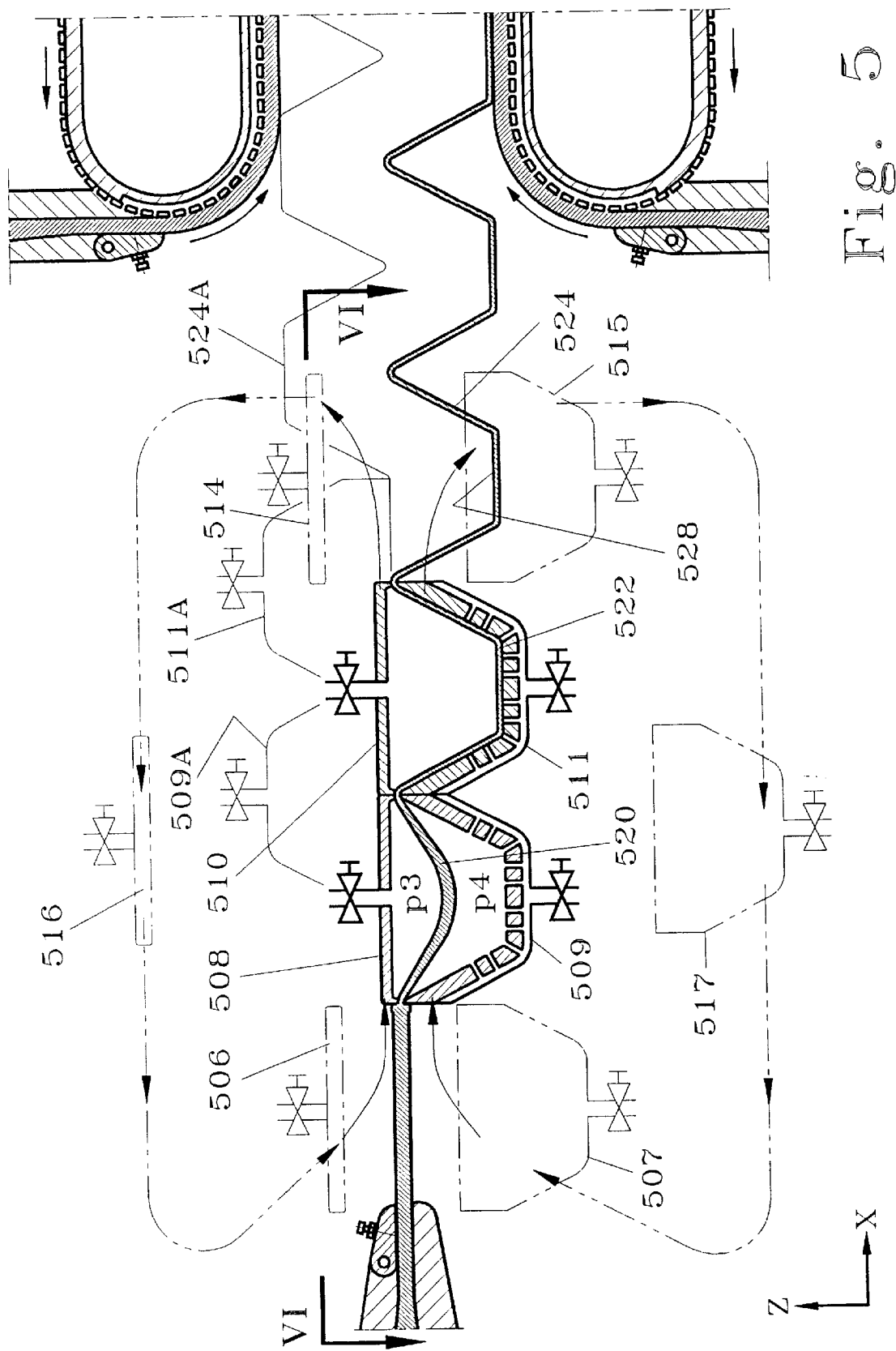
FIG. 5 is a vertical section of a vacuum-assisted core formation in the extrusion of a flat honeycomb structure where cells of the core are formed in two opposite directions, both of which are substantially perpendicular to the direction of extrusion.
Figure 6:
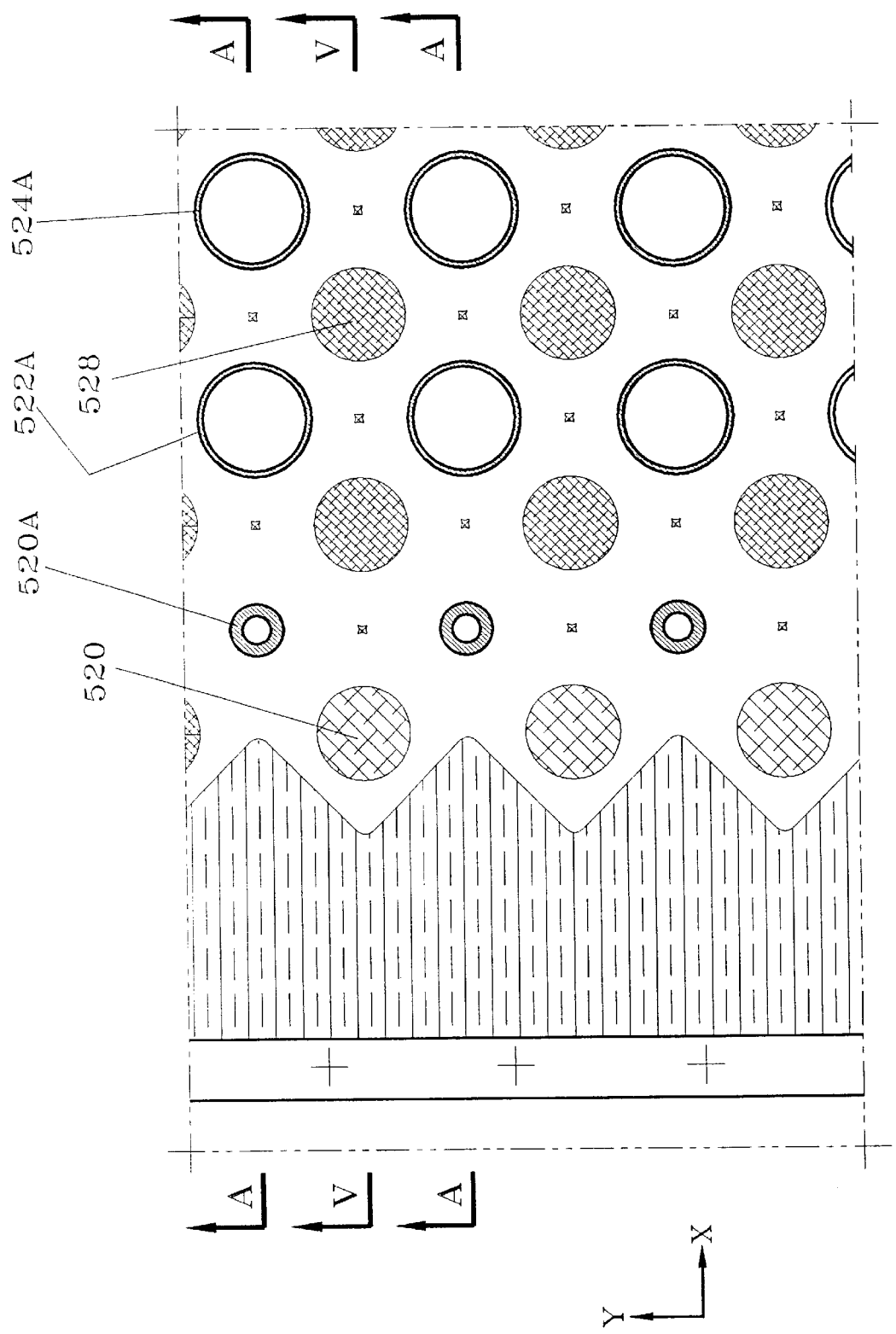
FIG. 6 is a horizontal section of the same honeycomb structure shown in FIG. 5.

Depending on the basic design of the core, the embodiments of the honeycomb structure of this invention fall into three groups:

"Chocolate Tray" core design where the core resembles vacuum-formed plastic trays for holding separate pieces of chocolate in a box of chocolate. All the domes of the core are oriented in one direction, as seen in FIGS. 1 and 3;

"Egg Tray" core design where the core resembles a cardboard or plastic tray for eggs. The domes of the core are oriented in two opposing directions, as shown in FIGS. 5, 6 and 7;

"Double Core" design, where the honeycomb structure itself seems to be formed as a union of two honeycomb structures with mutually complimentary cores, each of the adjoined honeycomb structures having one facesheet. Domes of one coresheet are oriented in one direction, and the equal-height domes of the other coresheet are oriented in the opposite direction and placed between the domes of the first coresheet. The top surfaces of the domes of one of the coresheets are fastened to the inner surface of the other coresheet between its domes and visa versa, so that we get better uniformity in the loads-carrying capability of such a honeycomb structure. An embodiment of this version (where the cores are of "Chocolate Tray"-type) is illustrated in FIGS. 8 and 9.

DETAILED DESCRIPTION OF INVENTION AND ITS KEY EMBODIMENTS

With the exception of the last two drawings, the drawings illustrate the extrusion of a coresheet, its deformation into a core, extrusion of facesheets upon the opposing face surfaces of the core, and fusing of the respective contact surfaces of the core with the facesheets. Each of these drawings is a "snapshot" in the technological process of making a given embodiment of the invention.

In all drawings X-Y-Z coordinates are shown for reference: X in the direction of coresheet extrusion, Y in the horizontal direction which is also perpendicular to the direction of the extrusion of coresheet, and the vertical coordinate Z. In all the embodiments of this invention shown in these drawings, Z coincides with the direction of the axes of domes.

In all the drawings, phantom lines (line/dot/dot) with arrows illustrate trajectories of the upper and the lower chains of mold blocks and plungers; the mold blocks and plungers which are returning to their respective positions of the "initial contact position" with the facesheet are also drawn with phantom lines. In order to make the reading of drawings easier, the position numbers of alike elements on different drawings have the same two last digits; the first digit refers to a given embodiment.

Figure 2:
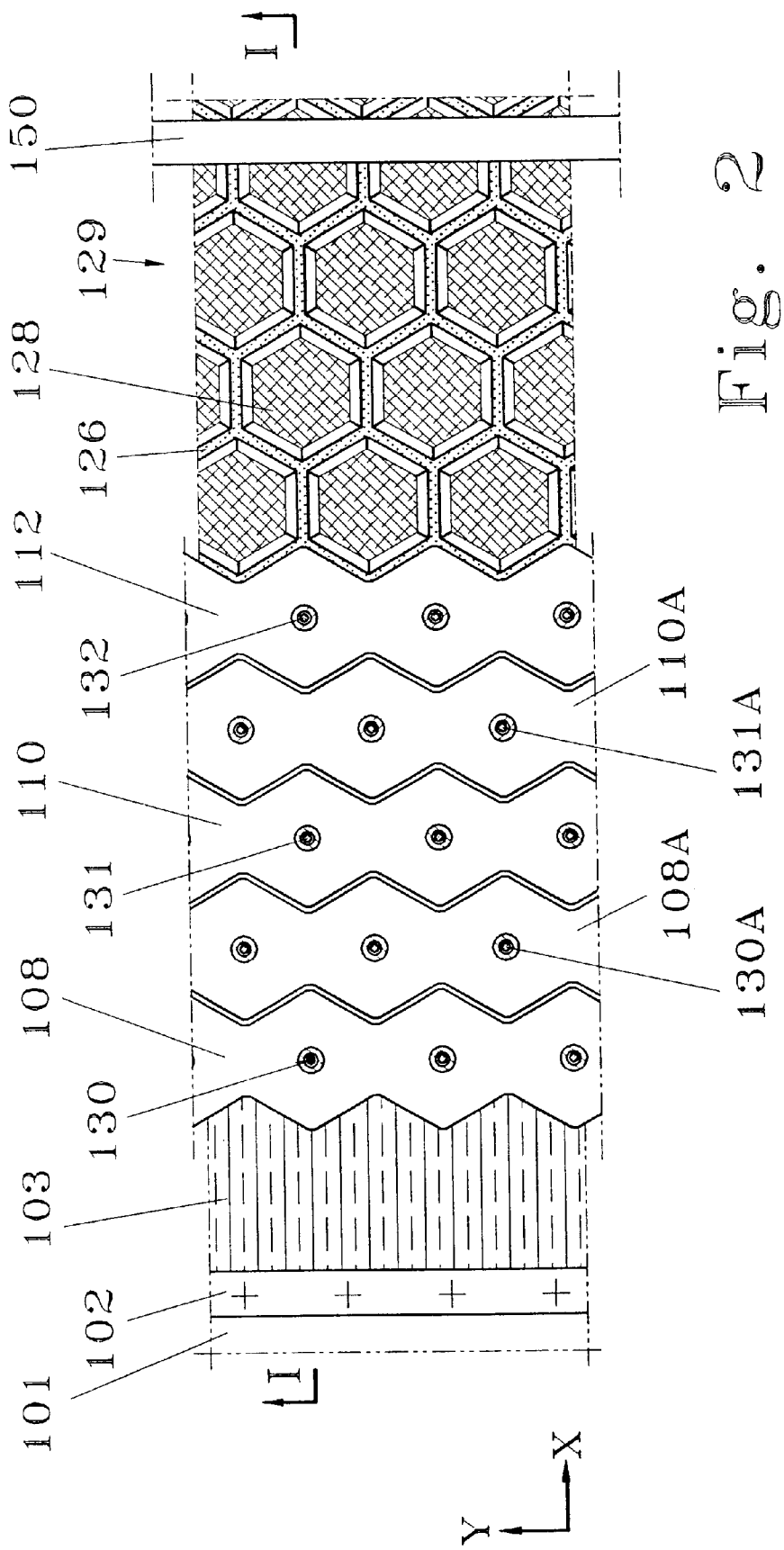
FIG. 2 is a horizontal section of the same honeycomb structure shown in FIG. 1.

FIGS. 1 and 2 illustrate plunger-assisted and vacuum-assisted production of a honeycomb structure with a "Chocolate-Tray"-type core. 101 is main extrusion head; the main extrusion head has the means, shown as an adjustable lip pos. 102, for setting the process up for different thicknesses of the freshly extruded coresheet, pos. 103. The coresheet 103 is extruded in the direction X with the speed v.

The direction of extrusion of the coresheet 103 is also substantially transverse to cell axes of the core. (To illustrate the point, in FIG. 1 the direction of extrusion is given by an associated arrow indicating the speed of extrusion v, and a core axis is marked by 155.) All other honeycomb-related extrusion technologies known to me, with the exception of the currently pending U.S. Pat. No. Proposal by V. Prutkin and O. Kalman, extrude honeycomb and honeycomb cores in the direction of the axes of their cells.

There are two sets of mold blocks, an upper and a lower set. Each of these sets of mold blocks is moving along its own rotational trajectories marked as 104 and 105 respectively. When in contact with the coresheet 103, the mold blocks of both chains are moving with the same speed, v, in the direction X as does the coresheet.

During the return movement of the mold blocks to their respective positions of the "initial contact position", the mold blocks and plungers are also cooled.

In this particular implementation, each of the upper mold blocks also has a plunger which moves with its mold block along its trajectory 104, but has its own movement in the direction Z. In this particular embodiment, the purpose of plungers is to pre-deform the given dome before it will be formed into its final shape by the difference of pressures p1 and p2 triggered on both sides of this dome.

The upper mold blocks shown in FIG. 1 are 108 (shortly after going through its "initial contact position"; at the depicted moment of the "snapshot", the initial deformation of the coresheet has already occurred, see the dome pos. 120 in its initial stage), 110 (at the time when the deformation of the dome 121 is in its intermediate stage), 112 (at the time when the deformation of the dome 122 is already completed and just before the mold block 112 starts the return leg of its trajectory), 114 (shown in the beginning of its moving away), 116 (moving in the opposite direction to X), and 106 (just before the mold block moves back to its "initial contact position" in which the mold block will come into contact with the freshly extruded coresheet and starts another "working cycle").

The plunger 130 is performing the initial stage of the "dome formation". The plunger 131 is shown around the end of its forming duty; from here on, the forming of the dome 121 will be taken over by the difference in pressures on both sides of the dome, p1 and p2. The plunger 132 is shown after its assistance in forming the dome has been rendered. By that time, the dome 122 has already been brought into its final shape.

The domes 123 and 124 are moving in the direction X without assistance on mold-blocks. (The dome 125 has already been adjoined with the facesheets 144 and 145 and is in the process of being fused with them to become an integral part of the monolithic honeycomb structure.) In the process of forming and, if needed, after the mold-blocks have been removed, these domes and the corresponding segment of the interconnecting structure have been cooled into the state in which the core 129 is ready as a "substrate" for the facesheets.

As is obvious from FIG. 1, the actual forming of domes is conducted within the cavities of the lower mold blocks. The lower mold blocks shown in FIG. 1 are 109, 111, 113, 115, 117, and 107. The mold block 109 is shown shortly after passing its "initial contact position"; at the depicted moment of the "snapshot", the initial deformation of the coresheet has already occurred, see the dome pos. 120. The mold block 111 is shown at the time when the deformation of the dome 121 is in its intermediate stage. The mold block 113 is shown at the time when the deformation of the dome 122 is already completed, and just before the mold block 112 starts the return leg of its trajectory. The mold block 115 is shown when it starts moving away from the core. The mold block 117 is already moving in the opposite direction to X. The mold block 107 is shown just before the mold block moves to its "initial contact position" and starts another "working cycle".

In this particular embodiment, the cavities of lower mold blocks and, consequently, the fully formed domes, have hexagonal cross-sections. In the vacuum-assisted embodiments, there are holes 118 through which the vacuum (p2) can be created in the cavity. The creation of vacuum in a cavity is controlled by valve 119.

150 and 151 show the approximate positions of the optional low inertia heaters placed just upstream from the "zone of interconnection and fusion", or "zone of contact" for short (just before the materials 142 and 143 of the facesheets 144 and 145 are extruded upon the face surfaces of the core) which heat up the upper layers of the upper face surface 126 and the lower face surface 127 of the core 129. In order to infuse maximal heat energy into the outer surface layers of the core, the materials 142 and 143 can be extruded at the highest recomended extrusion temperatures for the given material(s).

The facesheet materials are continuously extruded through the respective "facesheet extruder heads" 140 and 141. Usually the thicknesses of the facesheets, H1 and H2, are considerably larger than the thickness of the core material in the zones of contact between the coresheet and the facesheets. By elevating the facesheet extrusion temperature to the highest allowable extrusion temperature for that particular material, we can supply more heat energy to the zone of contact than was lost during the forming and cooling of the core. Still, it is expected that in order to efficiently fuse some pairs of materials, there could be a need for optional heaters.

The material 142 of the upper facesheet 144 is extruded through the upper facesheet extrusion head 140. The material 143 of the lower facesheet 145 is extruded through the upper facesheet extrusion head 141. The flows of extruded materials 142 and 143 are directed by moving belts 146 and 147 which have openings in them into the respective vacuum chambers 148 and 149. The vacuum helps to keep the extruded material moving with the belts 146 and 147. 154 is an inside space of a dome; 155 is the interconnected outside space between the domes inside a honeycomb structure.

In this particular embodiment, as it is illustrated in FIG. 2, the domes of the core are arranged in an hexagonal pattern. The cross-sections of the domes themselves are also hexagonal. The domes of the neighboring rows are arranged in a staggered fashion. In order to simplify the drawing in FIG. 1, it shows only these rows of domes (and the corresponding upper and lower mold blocks) the axes of which are in that particular section (see Section I—I in FIG. 2). FIG. 2 helps to recognize the actual top view of the upper mold blocks (and also to guess the shape of the lower molds). The upper mold block 108 has in it as many plungers 130 as there are domes in that row of domes. The next upper mold block 108A (not shown in FIG. 1) has as many plungers 130A (also not shown in FIG. 1) as there are domes in that row. Another upper mold block and its row of plungers not shown in FIG. 1 are those which are marked 110A and 131A, respectively.

In FIG. 2, the freshly extruded coresheet, 103, is identified by horizontal line/dash/line-type hatch. The inner bottoms of the domes, 128, are identified by a half-crossed hatch. The upper zone of contact, 126, of the core 129 is identified by a hatch of small horizontal/vertical crosses. The inner walls of the domes are left unhatched.

The height of the domes is marked h; the overall thickness of the honeycomb structure is marked H.

As it can be inferred from FIGS. 1 and 2, honeycomb structures of this invention can be extruded from all extrudable (coextrudable) and mutually fusible combinations of materials. The limitations on the dimensions and the rate of production of a honeycomb structure are those which are determined by the extrusion process, such as the maximum capacity of extruder(s) used, maximum width of the sheet, and other particularities of the extrusion process for a given material or materials, and given extrusion heads. Also, a honeycomb structure of this invention may be of almost any desired cross-section, not only a straight panel with a constant cross-section. For instance, a honeycomb panel of this invention can be a multicurved panel with periodically changing cross-section (both in the direction of the extrusion and along the width of the extruded panel), and so on.

In other words, the invented method of production does not impose its own additional limitations on the physical dimensions of the honeycomb structure: the limitations are those dictated by the existing extrusion technology and the particularities of the selected materials.

Figure 4:
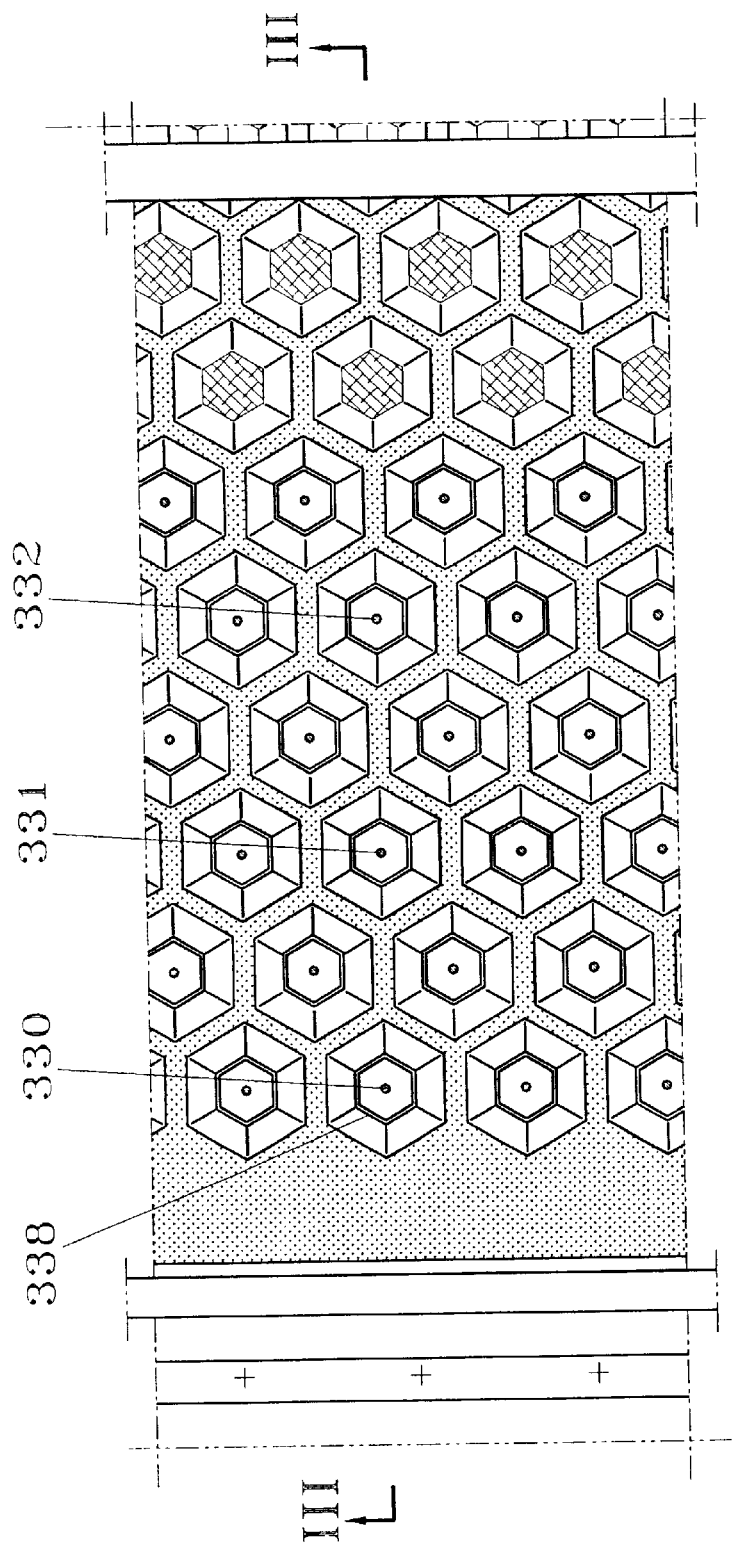
FIG. 4 is a horizontal section of the same honeycomb structure shown in FIG. 3.

The next embodiment of the invention is illustrated in FIGS. 3 and 4. Here the core of the "Chocolate Tray"-type honeycomb structure is formed without the assistance of vacuum. Here the lower mold blocks help to form only the upper contour and the bottom of the domes. The shape of the dome is formed by stretching the material between the upper contour of the lower mold block and the shape of the lower part of the plunger marked 338 in FIG. 4.

Before being formed into domes, the freshly extruded material goes through a number of forming and cooling rollers 390. The plunger 330 is shown in the position when the forming process has just began. The plunger 331 is in the midway position, and the plunger 332 shows the end of the forming motion of a plunger in Z direction. Then the plungers are returning to their starting position at the trajectory 304. The rest of the technology remains analogous to that shown in FIGS. 1 and 2.

FIGS. 5 and 6 illustrate the embodiment when the domes are formed by the difference of pressure p3 and p4 on two sides of a dome 520 being in the process of forming in the lower mold block 509. An already formed dome 522 is shown still in the lower mold block 511. The dome 524 is already released from its mold block 515. 528 indicates the inner bottom surface of the dome 524.

The core of the embodiment of the honeycomb structure shown in FIGS. 5 and 6 has checkerboard-type arrangement of domes resembling those of an egg tray. This becomes obvious in FIG. 6. Other arrangements of domes are also feasible.

In FIG. 5, the lower mold blocks 509 and 511, the cavities of which happened to be in the Section V—V (see FIG. 6) and which are in contact with the core material, are drawn in a thick line. When the mold blocks of the same group are in their returning trajectory, such as 515, 517 and 507, they are drawn in a phantom line (line/dot/dot). The same is valid for the upper mold blocks of the same section, Section V—V: the "working" upper mold blocks 5b8 and 510 are drawn in a thick line, and the "returning" upper mold blocks 514, 516 and 506 are drawn in a phantom line.

The identical Sections A—A (as the sections are defined in FIG. 6) pass through the axes of the upper mold blocks which are mirror images of the lower mold blocks in the Section V—V and operate in the opposite direction. These mold blocks 509A and 511A are drawn in a thin line in FIG. 5. The domes formed upwards, such as the dome 524A, are also drawn in a thin line.

Along with the domes 520, 522, etc., FIG. 6 shows domes which are directed in the opposite direction than the above mentioned domes. FIG. 6 is defined by Section VI in FIG. 5. That section cuts through all the upwards oriented domes 522A, 522A and 524A, as shown in FIG. 6.

FIG. 7 illustrates a version of the "Egg Tray" embodiment the core which is formed by plungers alone. In preparation for the core molding process, the freshly extruded core material goes through a system of forming and cooling rollers 790, much as in the embodiment shown in FIGS. 3 and 4.

The heaters marked by 750 and 751 are shown as contact heaters. 756 and 757 are two mutually separated spaces inside an "Egg Tray"-type honeycomb structure. However, these two separated spaces can be unified by cutting openings through some or all of the domes before the extrusion of the facesheets.

FIGS. 8 and 9 show a "Double Core" embodiment of this invention. The domes associated with one of the facesheets are situated between the domes associated with the other facesheet. 854 is the inside space of a dome associated with the upper facesheet 844, and 853 is the inside space of a dome associated with the lower facesheet 845. The conditions for such an arrangement in which one set of domes is nesting between the domes of the opposing direction is that the sets of domes are mutually compatible: both sets of domes have to be of the same height, h1=h2, and the arrangement of the domes have to be mutually complimentary. In this particular embodiment, the domes associated with the upper facesheet 844 are arranged in groups of six on a diameter D1, equally spaced. The domes associated with the lower facesheet 845 are arranged in groups of three on a diameter D2, also equally spaced, where D1=D2. 855 is the interconnected space inside the honeycomb structure which is outside of the domes.

Any and all of the separate or interconnected spaces inside a honeycomb structure can be filled with a wide variety of substances during its production.

EXAMPLE: COST EVALUATION

The evaluation of the expected cost of mass-produced honeycomb structure of this invention has been conducted according to a traditional cost estimation procedure. Here are some of the assumptions that were used:

The costs of extruders and their support equipment, depending on their nominal production capacity, are from $150K to $1M each;

Each production line has a set of four different but equal-capacity core forming systems for making different kind or size honeycombs. The costs of such sets of core forming systems, depending on their nominal production capacity, are from $400K to $1.25M;

A production line produces 2,000 hours per shift per year at 80% efficiency, in a three-shift operation;

A production line is run by two people, each costing the company $30 per hour, including wages, benefits, etc.; the maintenance is extra;

The consumption of electric power is 0.5 kWh per pound of resin used (the usual figure for coextrusion of polymers);

Production (and office) space is 5,000 ft$^2$, its annual rent $30K;

PET resin costs 45 cents per pound.

In the cost evaluation, the cost of equipment includes the cost of traditional extruding equipment and the cost of the forming system assembly for that particular capacity production line. That summary cost is represented by its standard (five-year) depreciation. The cost of the forming system assembly includes the cost of four different, interchangeable honeycomb forming system assemblies for that particular production capacity. Each of the forming system assemblies is for a specific core size; however, a core can be mated with facesheets of different thicknesses, and both the core and the facesheets can be made of a wide variety of materials. In other words, the same forming assembly can be used for making honeycombs with the same shape core but with a wide range of different thickness facesheets, and can be used to make the core and the facesheets from a variety of compositions, provided that the adjoining pairs of compositions are mutually fusible.

Figure 10:
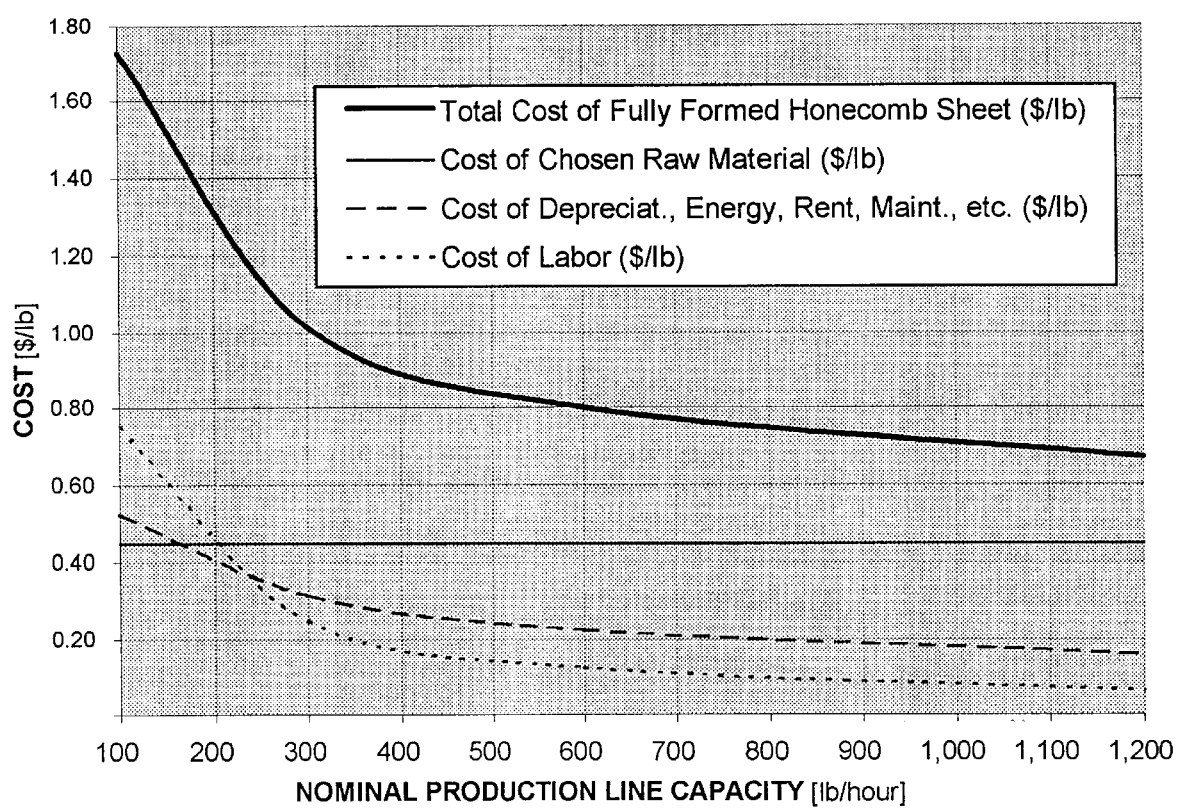
FIG. 10 is the expected cost of honeycomb sheet as a function of the nominal production line capacity.

FIG. 10 illustrates the expected cost of a complete universal honeycomb structure, made from PET (Polyethylene Terephthalate, a polymer from which Coke bottles are made) as a function of normal productivity of a production line. (At the time of filing of this invention, the cost of PET resin was about 45 cents per pound.)

It is obvious from FIG. 10 that the larger the productivity of a production line, the smaller the cost of our universal purpose honeycomb: for a 300 lb/hour production line, the expected production cost of the invented honeycombs is 57 cents per pound; for a 600 lb/hour line, it is 35 cents per pound; and for a 1,200 lb/hour production line the expected production cost comes down to 22 cents per pound (which does not include the cost of the raw material). Also, as it is observed in the polymer extrusion business, it could also be expected that a higher-capacity production line produces a more consistent product.

If such honeycombs are, say, five to twenty times lighter than equal-rigidity solutions made from the traditional solid sheets, bars, boards, profiles, etc. of about the same cost materials, the use of the invented and mass-produced honeycombs is obviously an advantageous alternative.

If a honeycomb sheet made from a bottle-grade PET weighs 8 lb/ft$^3$, a 600 lb/hour production line will produce 360,000 board feet of such honeycomb in a month (three shifts) at the expected cost of 54 cents per board foot. In other words, a one inch thick complete honeycomb structure made of PET and weighing 0.667 lb/ft$^2$ can be produced in up to 8 feet wide sheets of any length at the cost of 54 cents per board foot. That cost can be further reduced by reducing the volume weight of the honeycomb, or by using a less costly raw material (for instance, by mixing recycled PET and/or low-cost fillers into the same resin), or by a combination of the above.

SUMMARY, RAMIFICATIONS, AND SCOPE

Thus, it has been shown that the invented fully extruded honeycomb technology differs in crucial aspects from all known honeycomb structures. All the other extruded honeycombs, with only one exception described in the above-mentioned pending U.S. patent application Ser. No. 08/832,343, are extruded in the direction of the axes of their cells; the honeycomb structure of this invention is extruded in the direction substantially perpendicular to the axes of its cells.

The invented honeycomb technology differs from that described in the pending U.S. Patent Application in two significant ways:

First, the core of the pending Patent Application is made of a large number of elements; for instance, when making a four feet wide honeycomb with 5 mm cells, the core has to be assembled from over 240 separate core elements; the number of core elements goes up for wider honeycombs and/or smaller size of their cells. The core of this invention, no matter how wide the honeycomb or how small the size of its cells, is made from only one element;

Second, while each of the core elements of the pending Patent Application has to be separately formed and fused with its neighboring elements according to a quite complicated routine, the core of this invention is continually formed from a single continuously extruded sheet.

In other words, the construction of the product, especially of its core, are fundamentally different from those of this invention, and the method of production (and a corresponding apparatus) for making the honeycomb structure of the pending Patent Application are not only different, but are also at least by a degree more complicated than those of this invention.

It has also been shown that the invention provides an extruded complete honeycomb structure, comprised of a core and at least one facesheet, which is:

extremely simple and reliable in its construction—it consists of only two to four elements, assembled into the structure when the elements are largely in their pliable state;

made without using chemicals in its production process;

versatile (as universal as possible) in its applications;

free of technology-dependent residual stresses—instead of being joined together by gluing, welding or other special means of fastening, its elements are seamlessly fused together when the materials of the joining elements are still in their mutually fusable state;

minimally prone to the stress concentrations caused by anomalies in the honeycomb structure—the core is well calibrated during the stage of its forming, and the "assembly" of the core with one or two facesheets is "self-adjusting" to the elements involved;

suitable for mass production—the core and the facesheets are produced and interconnected in a single technological sequence;

free of severe restrictions regarding the physical dimensions of the honeycombs during its production process—the actual limitations are quite similar to those imposed on products like extruded sheets;

mass-produced at the lowest possible cost of production—the cost of production is expected to be between 27 and 57 cents per pound of honeycomb, depending on the productivity of the production line;

versatile and extremely economical in selection of its raw materials—the invented honeycomb structure can be made from a variety of materials with a wide scope of different properties, and the raw materials are in the least expensive form possible, as powder or pellets;

as versatile and universal in its applications as it is advantageous for commercial considerations at the time.

The overall commercial objective of this invention is also accomplished: the honeycomb structure of this invention provides the easiest means for large-scale conversion of "non-captive" industries toward the use of ready-made honeycomb structures which are affordable and often highly advantageous alternatives to their traditional raw materials used to provide the rigidity and some other characteristics to their products.

Everything said here about extrusion is equally valid for coextrusion. For instance, a facesheet can be coextruded with a thin outside layer of other material to change the properties of the outside surface, to provide a barrier layer against the environment, to change the appearance, and so on. Coextruded layers can be as thin as 5 $\mu$m or as thick as it is advantageous for any particular case; furthermore, each of the facesheets can be a coextrusion of many layers.

Although the invention is described herein with reference to three basic embodiments of the honeycomb structure, one skilled in the art will readily appreciate that other embodiments may be added to those set forth herein without departing from the spirit and scope of the invention.

For instance, since honeycomb structures of the "Egg Tray" group of embodiments have all the cavities of the domes formed in one direction mutually connected and, respectively, all the cavities of the domes formed in the opposite direction mutually connected, we have a structure with two large systems of interconnected spaces in the honeycomb structure. This fact opens up a wide variety of opportunities. For instance, such honeycomb structures are well suited as heat exchangers. Or else, walls of buildings made of such honeycomb structures can be filled with concrete, or with any other material.

Furthermore, this idea of interconnecting the spaces between selected groups of domes, or even the entire space between facesheets can easily be done for all the embodiments: in the process of manufacturing cores, it is relatively easy to mechanize cutting of notches in the walls of all the domes, or in the walls of selected groups of domes.

Continuous extrusion process allows us to produce a honeycomb structure with any number of longitudinally extruded male and/or female interlocking elements, so that two or more honeycomb structures can be easily assembled in various required configurations. The simplest example is that we can adjoin side-by-side relatively narrow honeycomb sheets (the width of which is limited by the extrusion capability) with interlocking elements in their edges into as wide a sheet as needed. We can make "I"-beams by locking together three separately extruded flat honeycomb structures where the edges of one of the structures are interlocked perpendicularly at the middle points of the two other structures. We can make enclosed structures by interlocking a honeycomb structure of simpler shape. The interlocking elements can be extruded into various points of the cross-sections of a honeycomb structure to increase the variety of configurations which can be assembled using the given set of a honeycomb structure.

These interlocking elements themselves can be designed to fit a wide variety of special needs. For instance, the interlocking elements can be designed for equal load with the rest of the honeycomb structure, or can act as a safety device (to break off or in some other way release the stress) when the load, pressure, temperature, vibration or some other external condition exceeds a predetermined level, or can act as a compensating element between rigid and/or expanding and contracting structural elements, and so on. In other words, the specially located and designed interlocking elements open still another vista of creative possibilities for extruding a honeycomb structure.

The art of extruding various interlocking elements is already well developed and known to experts in the field.

There is another beneficial by-product associated with this invention: by properly selecting the foam-like substance based on its hardening and other characteristics, we can enhance various performance aspects of a honeycomb structure, such as the strength, the load-carrying capability, the thermal and noise insulation, the shield effect, and so on, by filling honeycomb structures with the selected foam-like substance.

With some modifications, the core-formation units of this invention can be made independent from the heat of the extrusion. Then such a unit can operate at some distance from the main extruder, or even be turned into a stand-alone unit for making honeycomb cores from a stored web of core material. For instance, we can continuously feed the core material from a room-temperature web and heat the material up just before it enters the core-formation unit.

Therefore any other modification and/or variation is possible, provided it is within the scope of the claims of the present invention.

Considering the past experience of the extrusion industry, there is reason to expect that, after four to five years of production experience, the performance of mass-produced universal honeycomb structures of this invention will come close to, or even surpass, the performance of some of the currently produced special-purpose honeycomb structures.

We claim:

1. A method of continuously extruding in a direction of extrusion a honeycomb core having two substantially parallel face surfaces substantially parallel to said direction of extrusion and consisting of a multitude of hollow dome-like cells arranged in a multitude of rows, said rows of said dome-like cells being placed in equal intervals and substantially perpendicular to said direction of extrusion, each of said dome-like cells having an axis substantially perpendicular to said direction of extrusion and substantially perpendicular to said two face surfaces, all said dome-like cells being monolithically interconnected by an interconnecting structure, comprising the steps of:

continuously extruding a coresheet of extrudable material in said direction of extrusion; and continuously deforming portions of said coresheet material in a direction substantially perpendicular to said direction of extrusion while said material is still in its pliable state to form said dome-like cells while said dome-like cells remain monolithically interconnected by said interconnected structure formed from that portion of said coresheet material which remains after said forming of said dome-like cells.

2. The method of claim 1, wherein said step of deforming is selected from the group of processes consisting of deforming by mechanical means, by fluid-pressure means, and by a combination of the above.

3. The method of claim 2 further including the steps of:

extruding at least one facesheet onto one of said two face surfaces of said core, and joining said at least one facesheet to said core by fusing it to said core in a zone of contact where said at least one facesheet is in a fusible state.

4. The method of claim 3, where the temperature in said zone of contact is controlled by a heating means.

5. A seamless honeycomb structure produced from an extrudable material which has a direction of extrusion and may be in a fusible state, comprising:

a core of a plurality of hollow dome-like cells having two parallel face surfaces, said dome-like cells being formed from a portion of a coresheet material and arranged into a plurality of rows of said dome-like cells, said rows of dome-like cells being located substantially perpendicular to said direction of extrusion, each of said rows of dome-like cells being placed on an equal distance from the next row in said direction of extrusion, all said dome-like cells being monolithically interconnected by interconnecting structure being formed from that portion of said coresheet material which remains after said forming of said dome-like cells; and at least one facesheet made of a fusible material and seamlessly attached to said core by fusion.

6. The seamless honeycomb structure of claim 5, wherein said at least one facesheet and said core are formed into an integral structure by fusion while said extrudable material is in said fusible state.

7. The seamless honeycomb structure of claim 6, wherein said dome-like cells of said core are oriented in the same direction, said interconnecting structure interconnecting all said dome-like cells is being a part of one of said two face surfaces of said core, and said honeycomb structure has spaces inside said domes and an interconnected space outside said domes.

8. The seamless honeycomb structure of claim 7, wherein said spaces inside said dome-like cells are filled with material selected from the group of materials consisting of solid materials, gaseous materials, liquid materials, and a combination of the above.

9. The seamless honeycomb structure of claim 7, wherein said spaces inside said dome-like cells are filled with one material selected from the group of materials consisting of solid materials, gaseous materials, liquid materials, and a combination of the above, and said interconnected space outside said dome-like cells is filled with another material selected from the group of materials consisting of solid materials, gaseous materials, liquid materials, and a combination of the above.

10. The seamless honeycomb structure of claim 7, wherein said interconnected space outside said dome-like cells is filled with material selected from the group of materials consisting of solid materials, gaseous materials, liquid materials, and a combination of the above.

11. The seamless honeycomb structure of claim 6, wherein said dome-like cells of said core are oriented in two opposing directions, and said domes and said interconnecting structure interconnecting said domes together divide the entire space between said two facesheets into two separate spaces.

12. The seamless honeycomb structure of claim 11, wherein one of said two separate spaces is filled with material selected from the group of materials consisting of solid materials, gaseous materials, liquid materials, and a combination of the above.

13. The seamless honeycomb structure of claim 11, wherein said two separate spaces are filled with the same material selected from the group of materials consisting of solid materials, gaseous materials, liquid materials, and a combination of the above.

14. The seamless honeycomb structure of claim 11, wherein one of said two separate spaces is filled with one material from the group of materials consisting of solid materials, gaseous materials, liquid materials, and a combination of the above, and the other of said two separate spaces is filled with another material from the group of materials consisting of solid materials, gaseous materials, liquid materials, and a combination of the above.

15. The seamless honeycomb structure of claim 11, wherein said two separate spaces are interconnected by cuts made through said dome-like cells.

16. The seamless honeycomb structure of claim 15, wherein said two separate spaces are interconnected by said cuts and filled with material selected from the group of materials consisting of solid materials, gaseous materials, liquid materials, and a combination of the above.

* * * * *